(12) United States Patent
Osborn

(10) Patent No.: US 7,752,167 B1
(45) Date of Patent: * Jul. 6, 2010

(54) METHOD AND APPARATUS FOR IMPORTING AND EXPORTING DIRECTORY AND CALENDAR INFORMATION TO AND FROM PERSONAL INFORMATION MANAGEMENT APPLICATIONS

(75) Inventor: Neal A. Osborn, Milpitas, CA (US)

(73) Assignee: PalmSource Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/869,647

(22) Filed: Jun. 14, 2004

Related U.S. Application Data

(63) Continuation of application No. 09/671,768, filed on Sep. 27, 2000, now Pat. No. 6,760,728.

(51) Int. Cl.
*G06F 17/30* (2006.01)

(52) U.S. Cl. ............... 707/621; 707/658; 707/999.107; 707/999.204

(58) Field of Classification Search ............ 707/1, 707/10, 100–102, 200–201, 104.1, 621, 658, 707/999.107, 999.204; 709/217, 203; 379/142.14; 715/239
See application file for complete search history.

(56) References Cited

U.S. PATENT DOCUMENTS

| | | | | |
|---|---|---|---|---|
| 6,018,761 A * | 1/2000 | Uomini | .................. | 709/206 |
| 6,061,688 A * | 5/2000 | Kilpatrick et al. | ........... | 707/102 |
| 6,260,044 B1 * | 7/2001 | Nagral et al. | ............... | 707/102 |
| 6,339,795 B1 * | 1/2002 | Narurkar et al. | ............ | 709/246 |
| 6,430,624 B1 * | 8/2002 | Jamtgaard et al. | ........... | 709/246 |
| 6,463,463 B1 * | 10/2002 | Godfrey et al. | ............. | 709/206 |
| 6,487,597 B1 * | 11/2002 | Horie et al. | ................. | 709/227 |
| 6,567,807 B1 * | 5/2003 | Robles et al. | ................. | 707/10 |
| 6,574,630 B1 * | 6/2003 | Augustine et al. | ............. | 707/10 |
| 6,584,321 B1 * | 6/2003 | Coan et al. | .................. | 455/466 |
| 6,590,892 B1 * | 7/2003 | Lenander et al. | ............ | 370/352 |
| 6,600,902 B1 * | 7/2003 | Bell | .......................... | 455/41.2 |

(Continued)

OTHER PUBLICATIONS vCard: The Electronic Business Card, A versit Consortium Wight Paper, Version 2.1, Jan. 1, pp. 1-4.*

(Continued)

*Primary Examiner*—Miranda Le
(74) *Attorney, Agent, or Firm*—Berry & Associates P.C.

(57) ABSTRACT

A method and system for importing and exporting selected directory and calendar information of a first format found in various electronic media to and from personal information management computer applications of a second format is described. Specifically, the present invention discloses a method and system for importing directory and calendar information that is structured in standardized vCard and vCalendar formats from a first application to corresponding electronic address book and calendar applications via clipboard and automatic translator applications. The invention includes an automatic translator that takes the standardized information from the clipboard application and translates the vCard and vCalendar information into a format that is native to the corresponding target application, e.g., electronic address book and calendar applications. Additionally, the present invention discloses a method and system for exporting directory and calendar information by translating record entries from the databases of the address book and calendar applications of particular native formats to corresponding standardized vCard and vCalendar formats and exporting the standardized information via electronic mail.

23 Claims, 13 Drawing Sheets

U.S. PATENT DOCUMENTS

| | | | |
|---|---|---|---|
| 6,601,111 B1 * | 7/2003 | Peacock et al. | 719/310 |
| 6,633,311 B1 * | 10/2003 | Douvikas et al. | 715/731 |
| 6,651,090 B1 * | 11/2003 | Itabashi et al. | 709/217 |
| 6,662,186 B1 * | 12/2003 | Esquibel et al. | 707/101 |
| 6,662,193 B1 * | 12/2003 | Christensen | 707/104.1 |
| 6,704,770 B1 * | 3/2004 | Ramakesavan | 709/205 |
| 6,728,530 B1 * | 4/2004 | Heinonen et al. | 455/414.1 |
| 6,738,462 B1 * | 5/2004 | Brunson | 379/142.06 |
| 6,754,665 B1 * | 6/2004 | Futagami et al. | 707/102 |
| 7,017,109 B1 * | 3/2006 | Douvikas et al. | 715/501.1 |
| 7,046,691 B1 * | 5/2006 | Kadyk et al. | 370/466 |
| 2002/0006126 A1 * | 1/2002 | Johnson et al. | 370/356 |
| 2002/0019825 A1 * | 2/2002 | Smiga et al. | 707/102 |
| 2002/0057292 A1 * | 5/2002 | Holtz | 345/769 |

OTHER PUBLICATIONS vCalendar: The Personal Caladaring and Schedualing Exchange Format, A versit Consortium Wight Paper, Version 2.1, Jan. 1, pp. 1-4.*

* cited by examiner

1100

```
begin : VCARD      ——1105
source : ldap : / / cn=bjorn%20Jensen,  O=university%20of%20Michigan,  c=US
name : Bjorn  Jensen    ——1115
fn : Bj=F8rn   Jensen
n : Jensen; Bj=F8rn
email;type=internet : bjorn@umich.edu    ——1120
tel;type=work, voice,msg : +1  313  747-4454   —— 1125
key;type=x509;encoding=B : dGhpcyBjb3VsZCBiZSAKbXkgY2VydGlmaWNhdGUK
end : VCARD    ——1110
```

BEGIN : VCALENDAR ———— 1205
VERSION : 2.0
PRODID : -/ /hacksw/handcal//NONSGML  vl.0//EN
BEGIN : VEVENT
DTSTART : 19970714T170000Z ———— 1220
DTEND : 19970715T035959Z ———— 1225
SUMMARY : Bastille Day Party ———— 1230
END : VEVENT
END : VCALENDAR ———— 1210

FIGURE 12

METHOD AND APPARATUS FOR IMPORTING AND EXPORTING DIRECTORY AND CALENDAR INFORMATION TO AND FROM PERSONAL INFORMATION MANAGEMENT APPLICATIONS

This application is a continuation of and claims the benefit of application Ser. No. 09/671,768 filed on Sep. 27, 2000 now U.S. Pat. No. 6,760,728 and which designated in the U.S.

BACKGROUND OF THE INVENTION

1. Field of the Invention

The present invention relates to the field of importing and exporting directory and calendar information to and from personal information management computer applications.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various personal information management (PIM) applications such as an address book, a daily organizer, scheduling calendar, and electronic notepads, to name a few. Palmtop computers with PIM software have been known as Personal Digital Assistants (hereinafter referred to as "PDAs").

Furthermore, the functionality of a computer system or other type of electronic system or device is dramatically enhanced by coupling these stand-alone devices together in order to form a networking environment. Within a networking environment, users may readily exchange files, share information stored on a common database, pool resources, and communicate via electronic mail (hereinafter referred to as "e-mail") and via video teleconferencing. Further, computers or other types of electronic devices which are coupled to the Internet provide their users access to data and information from all over the world.

The efficient exchange of personal information found in various electronic media into and out of personal information management (hereinafter referred to as "PIM") applications in computer systems, including PDAs, has been a challenge. Personal information including directory and calendar information, such as dates and times of events, meetings and classes, etc., can be found in text form in various electronic media (such as e-mail messages and Internet web sites) as well as within various PIM applications. The transfer of directory and calendar information of one application to corresponding PIM applications and the export of these types of information has heretofore been typically accomplished by manually re-typing the particular information into the specific PIM application.

Problems are involved with manually re-typing directory and calendar textual information into particular PIM applications. For one, this method is annoying and error prone because the user must cycle back and forth between the screen that displays the desired information and the input screen for the particular PIM application. To minimize error, the user may cycle back and forth at each field of entry: name, company name, work address, home address, work phone, home phone, etc. Not only is this time consuming, but the introduction of human error cannot be discounted.

Another and still time consuming method uses a computer operating system's drag/drop technique to transfer unformatted textual information to a text field of a particular PIM application. For example, to enter directory information found in an e-mail message, a user would carefully highlight by dragging over a particular field of information (e.g., name, company name, work address, home address, work phone, home phone, etc.), open the input screen of the PIM application, and then drop the information into the specific input field. This method is still time consuming and annoying as there is a need to separately cycle back and forth at each particular field of entry. Further, this method is not without error as incomplete and improper textual information that is highlighted is indiscriminately inputted into the specific input field of the PIM application.

Automatic transfer and entry of directory and calendar entries to and from a user's PIM applications previously could only be accomplished between two identically formatted PIM applications. For example, an entry within a first user's specific PIM application could only be transferred to an identical PIM application associated with a second user. No transfer of the information would occur if the second user had a differently formatted PIM application, and the second user must revert to manually re-typing the information into the PIM application.

Furthermore, directory and calendar information found in various electronic media such as e-mail or Internet web sites in text form is usually not of the same format as a user's corresponding directory and calendar application. Thus, without manually entering the information, a user could not transfer and enter the information into the corresponding directory and calendar applications from these media.

It would be advantageous to provide a more efficient method and system for importing and exporting directory and calendar information between applications.

SUMMARY OF THE INVENTION

Accordingly, a method and system for importing and exporting selected directory and calendar information of a first format found in various electronic media to and from personal information management computer applications of a second format is described.

The present invention provides these advantages and others not specifically mentioned above but described in the sections to follow. Specifically, the present invention discloses a method and system for importing directory and calendar information that is structured in standardized vCard and vCalendar formats from a first application to corresponding electronic address book and calendar applications via clipboard and automatic translator applications. The invention includes an automatic translator that takes the standardized information from the clipboard application and translates the vCard and vCalendar information into a format that is native to the corresponding target applications, e.g., electronic address book and calendar applications. Additionally, the present invention discloses a method and system for exporting directory and calendar information by translating record entries from the databases of the address book and calendar applications of particular native formats to corresponding standardized vCard and vCalendar formats and exporting the standardized information via electronic mail.

In one embodiment, in an electronic device, the method and system of importing directory information in a vCard format and calendar information in a vCalendar format into corresponding personal information management applications comprises the following steps: capturing within a displayed screen of an application such as electronic mail a block of information that includes the standardized vCard and vCalendar information; transferring the captured information to a support application resident on the electronic device such as clipboard that is an operating system tool available to a variety of applications, which is capable of supporting the aforementioned variety of applications and capable of providing interface between the aforementioned variety of applications; automatically extracting the vCard and vCalendar information; automatically translating the information structured in vCard and vCalendar formats to a second format that is native to the corresponding address book and calendar applications; and automatically storing the translated directory and calendar information as a record in the databases of the corresponding address book and calendar applications.

BRIEF DESCRIPTION OF THE DRAWINGS

FIG. 11 illustrates an exemplary sample of directory information in a vCard format in accordance with embodiments of the present invention.

FIG. 12 illustrates an exemplary sample of calendar information in a vCalendar format in accordance with embodiments of the present invention.

DETAILED DESCRIPTION OF THE INVENTION

Figure 1A:
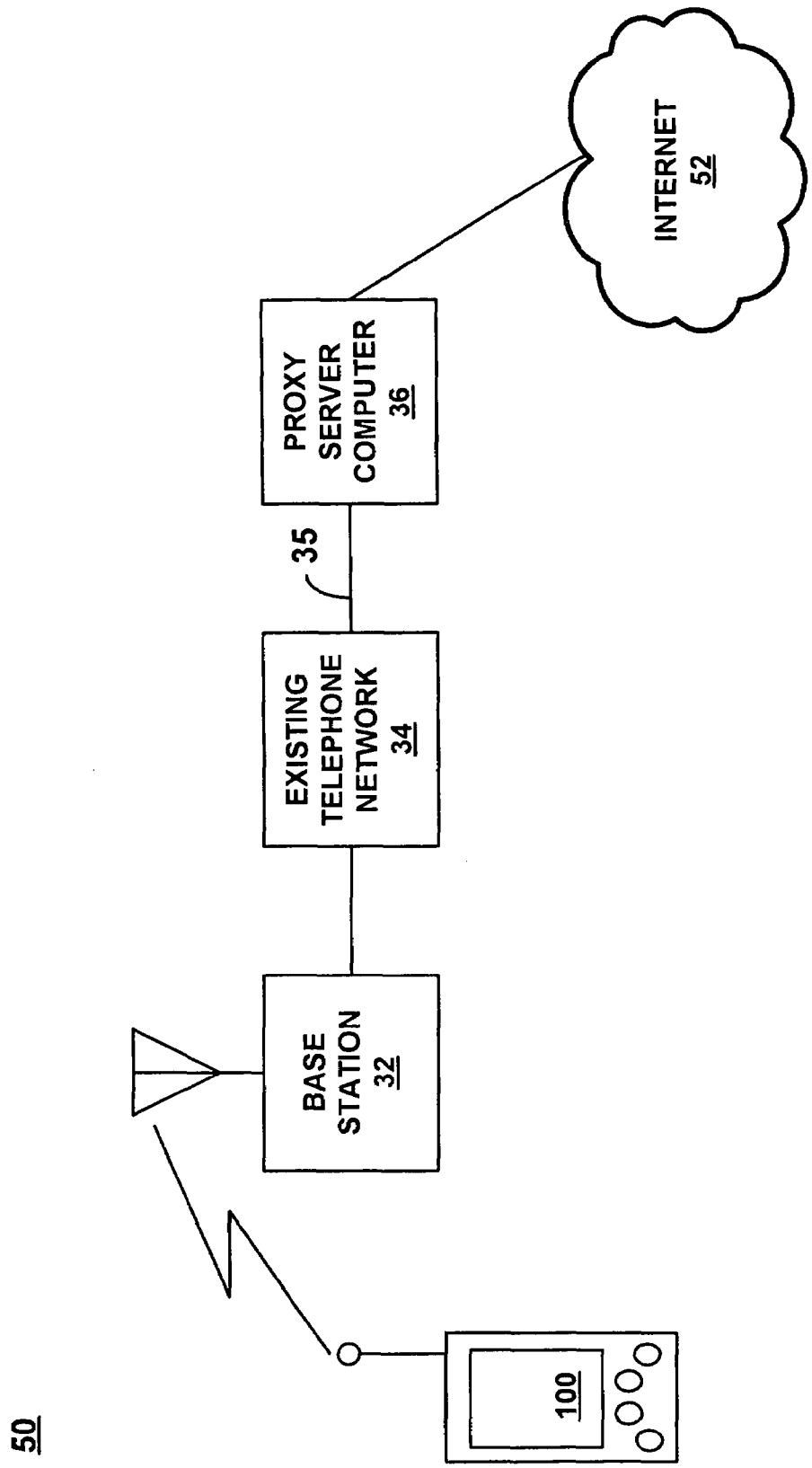
FIG. 1A illustrates a block diagram of a first exemplary network environment including a personal digital assistant in accordance with an embodiment of the present invention.

Reference will now be made in detail to the preferred embodiments of the present invention, a method and system for automatically importing and exporting selected information to and from computer applications, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Although the description of the present invention will focus on an exemplary personal digital assistant or palmtop computer system, the present invention can be practiced with other electronic systems or electronic devices (e.g., personal computer system, cellular phones, pagers, portable web devices, etc.).

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

One of the common types of electronic systems which can be used in accordance with one embodiment of the present invention is referred to as a personal digital assistant, or commonly called a PDA. The PDA is a pocket sized electronic organizer with the capability to store telephone numbers, addresses, daily appointment, and software that keeps track of business or personal data such as expenses, etc. Furthermore, the PDA also has the ability to connect to a personal computer, enabling the two devices to exchange updated information, that is synchronize the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface). In particular, the PDA can be used to browse Web pages located on the Internet. The PDA can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

FIG. 1A is a block diagram of an exemplary network environment 50 including an exemplary personal digital assistant. The PDA 100 is also known as a palmtop or palm-sized electronic system or computer system. The PDA 100 has the ability to transmit and receive data and information over a wireless communication interface (e.g., a radio interface). The PDA 100 is one exemplary implementation on which the present invention can operate. The present invention can operate on any portable electronic system or device.

In one embodiment, base station 32 is both a transmitter and receiver base station which can be implemented by coupling it into an existing public telephone network 34. Implemented in this manner, base station 32 enables the personal digital assistant 100 to communicate with a proxy server computer system 36, which is coupled by wire 35 to the existing public telephone network 34. Furthermore, proxy server computer system 36 is coupled to the Internet 52, thereby enabling the PDA 100 to communicate with the Internet 52. It should be further appreciated that other embodiments of a communications network may be utilized in accordance with the present invention.

The data and information which are communicated between base station 32 and the personal digital assistant 100 are a type of information and data that can conventionally be transferred and received over a public telephone wire network system. However, a wireless communication interface is utilized to communicate data and information between the PDA 100 and base station 32. It should be appreciated that one embodiment of a wireless communication system in accordance with the present invention is the Mobitex wireless communication system.

Figure 1B:
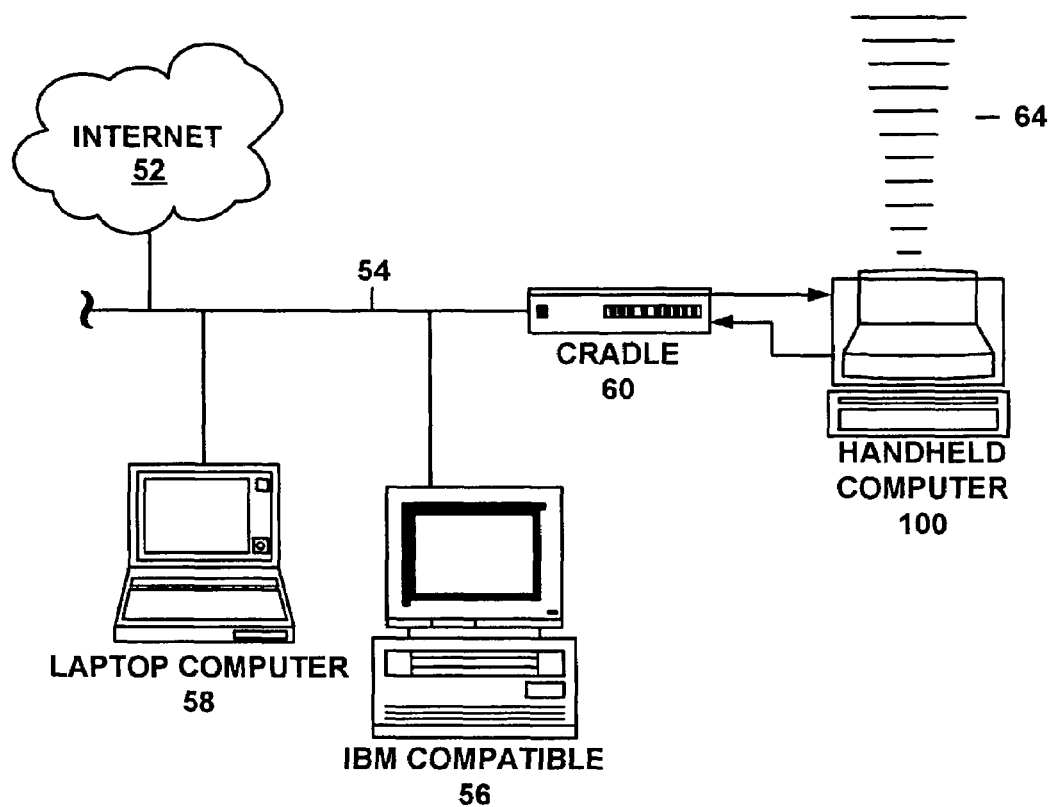
FIG. 1B illustrates a block diagram of a second exemplary network environment including a personal digital assistant coupled to other computer systems and the Internet via a cradle device in accordance with an embodiment of the present invention.

FIG. 1B illustrates a system 51 that can be used in conjunction with the present invention. System 51 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant 100 in one embodiment of the present invention. Cradle 60 provides an electrical and mechanical communication interface between bus 54 (and anything coupled to bus 54) and the computer system 100 for two way communications. Computer system 100 also contains a wireless infrared communication mechanism 64 (e.g., an infrared emitter and detector device) for sending and receiving information from other similarly equipped devices (see FIG. 1B).

With reference to FIGS. 1A and 1B, it is appreciated that the exemplary personal digital assistant or palmtop computer system 100 can be used in network environment combining elements of networks 50 and 51. That is, as will be seen below, the PDA 100 can include both a wireless infrared communication mechanism and a signal (e.g., radio) receiver/transmitter device.

Figure 2A:
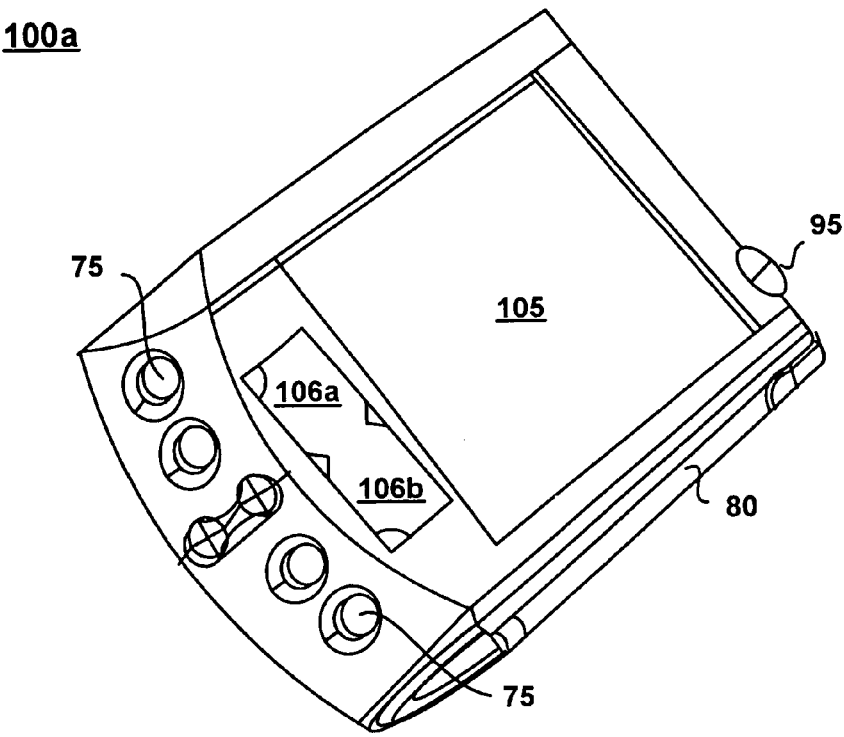
FIG. 2A is a top side perspective view of a palmtop computer system that can be used as a platform for the data entry and authentication embodiments of the present invention.

FIG. 2A is a perspective illustration of the top face 100a of one embodiment of the palmtop computer system. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a or 106b. The stroke information is then fed to an internal processor for automatic character recognition. Once characters are recognized, they are typically displayed on the screen for verification and/or modification.

Figure 2B:
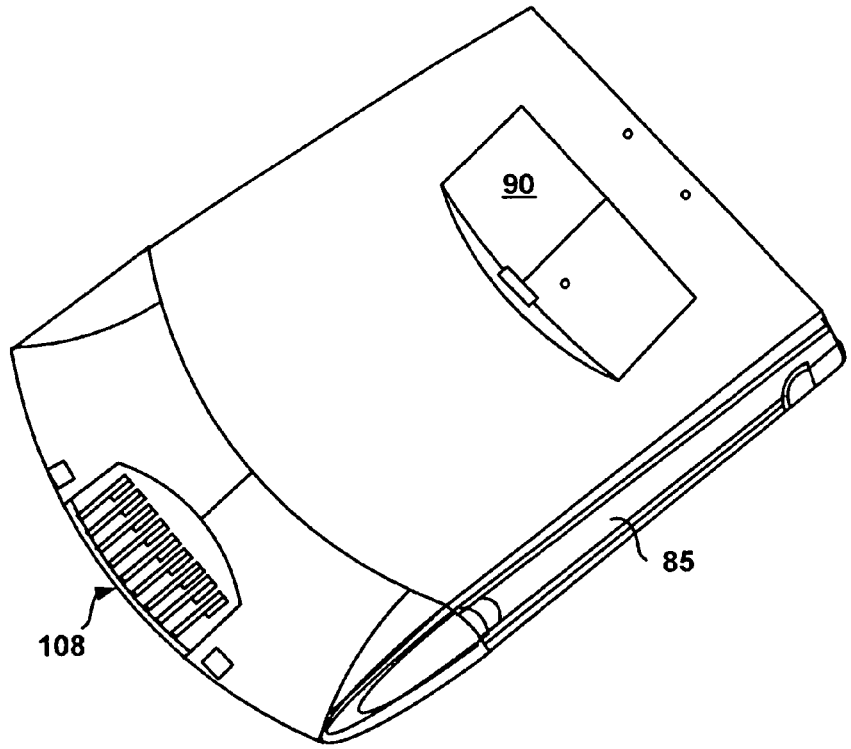
FIG. 2B is a bottom side perspective view of the palmtop computer system of FIG. 2A.

FIG. 2B illustrates the bottom side 100b of one embodiment of the palmtop computer system. An optional extendible antenna 85 is shown and also a battery storage compartment door 90 is shown. A communication interface 108 is also shown. In one embodiment of the present invention, the communication interface 108 is a serial communication port, but could also alternatively be of any of a number of well known communication standards and protocols, e.g., parallel, USB, SCSI, Firewire (IEEE 1394), Ethernet, etc. It is appreciated that interface 108 can also be used for charging current when using rechargeable batteries.

Figure 3:
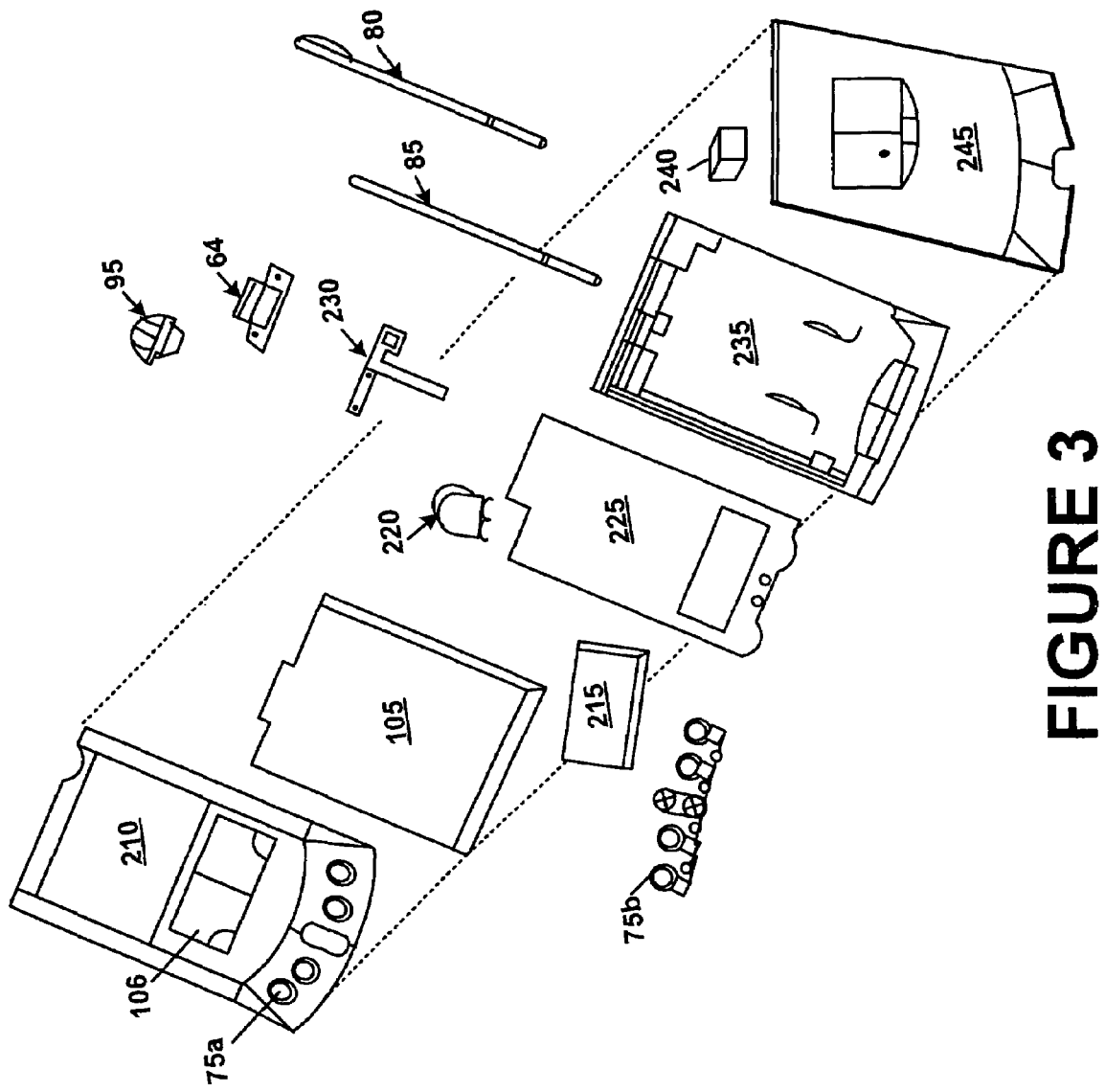
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. A digitizer pad can be part of the display assembly or it can also be included in PC board 225. A midframe 235 is shown along with stylus 80. Position adjustable antenna 85 is shown.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
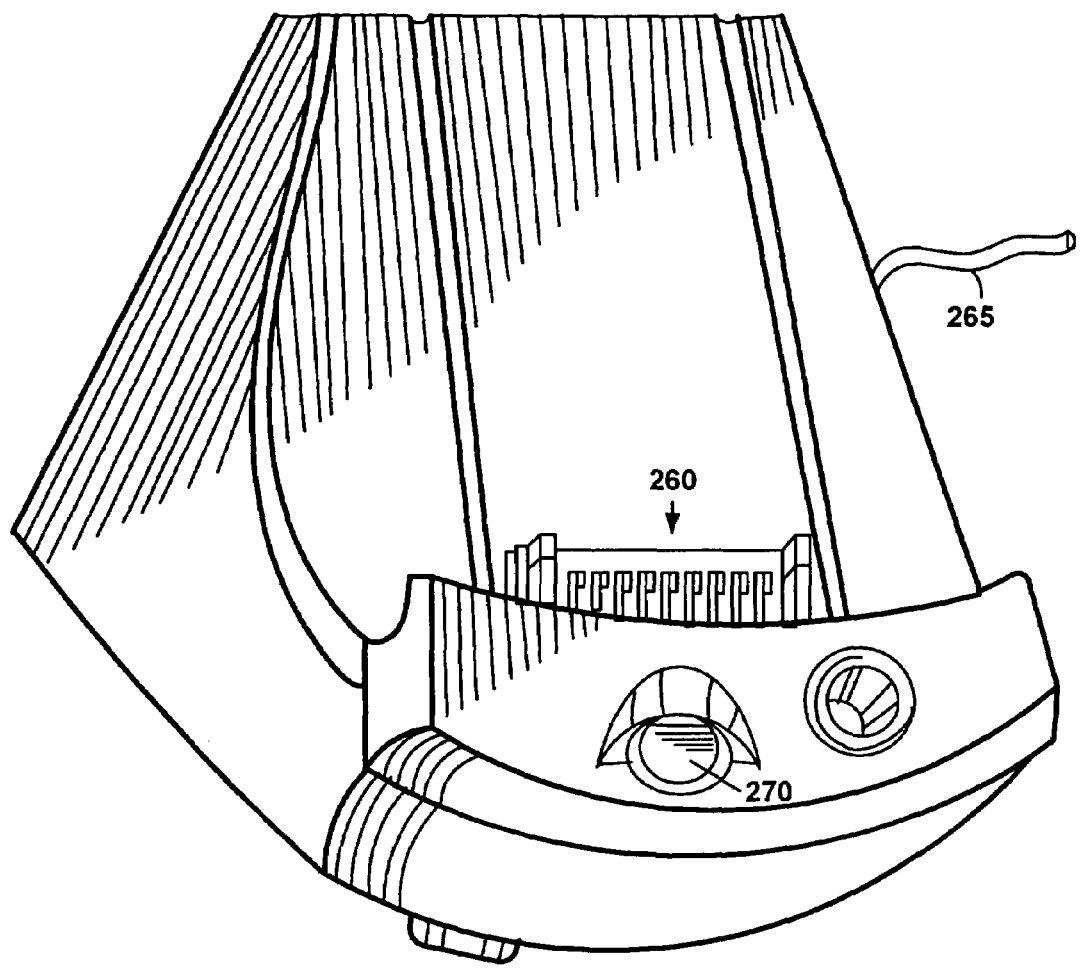
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with communication interface 108 (FIG. 2B) of computer system 100 when system 100 is slid into the cradle 60 in an upright position. Once inserted, button 270 can be pressed to initiate two way communication between system 100 and other computer systems coupled to electrical interface cable 265.

Figure 5:
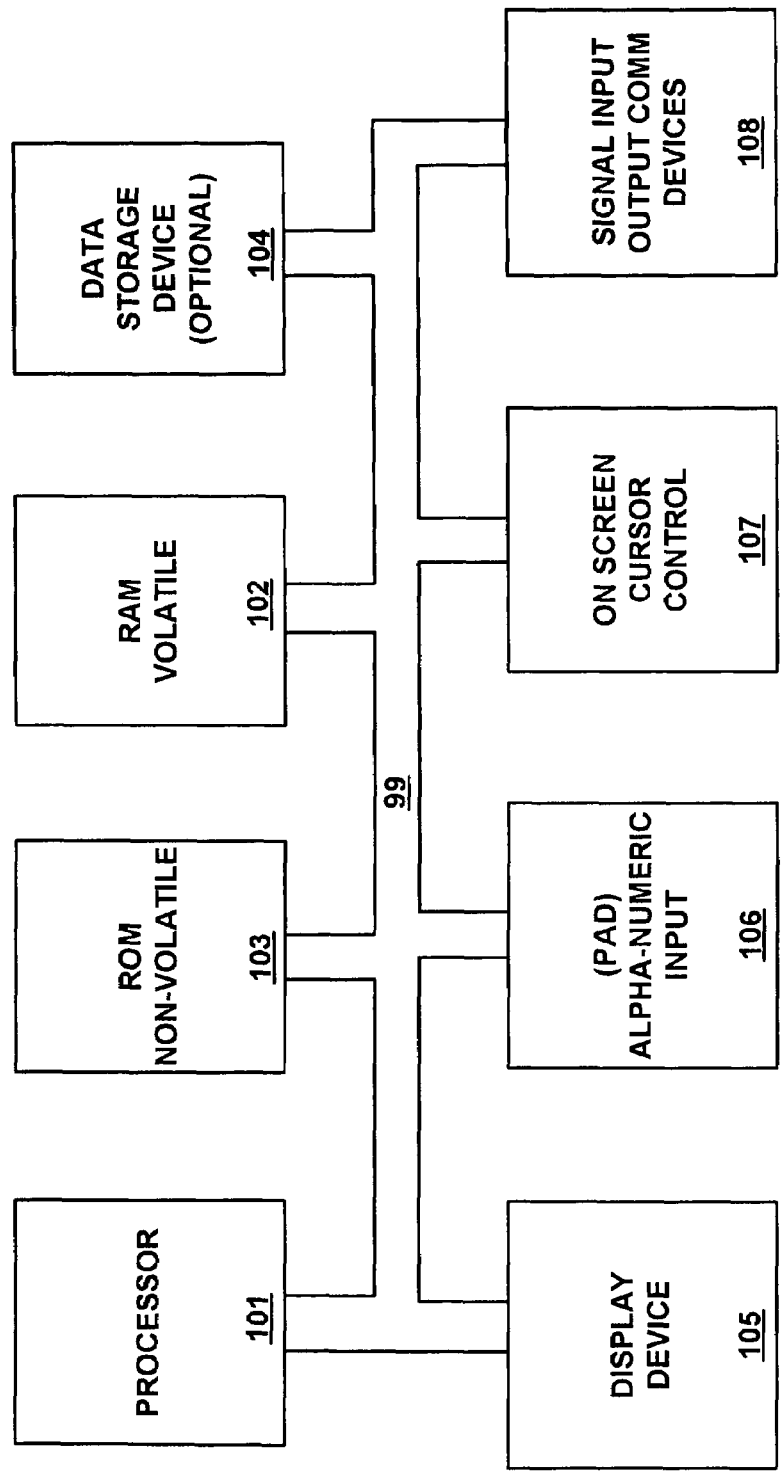
FIG. 5 is a logical block diagram of the palmtop computer system in accordance with an embodiment of the present invention.

Referring now to FIG. 5, portions of the present electronic system are comprised of computer-readable and computer-executable instructions which reside, for example, in computer-readable media of an electronic system (e.g., personal digital assistant, computer system, and the like). FIG. 5 is a block diagram of exemplary interior components of an exemplary personal digital assistant 100 upon which embodiments of the present invention may be implemented. It is appreciated that the exemplary PDA 100 of FIG. 5 is only exemplary and that the present invention can operate within a number of different electronic systems including general purpose networked computer systems, embedded computer systems, and stand alone electronic systems such as a cellular telephone or a pager.

FIG. 5 illustrates circuitry of an exemplary electronic system or computer system 100 (such as the personal digital assistant), some of which can be implemented on PC board 225 (FIG. 3). Exemplary computer system 100 includes an address/data bus 99 for communicating information, a central processor 101 coupled with the bus 99 for processing information and instructions, a volatile memory 102 (e.g., random access memory (RAM), static RAM dynamic RAM, etc.) coupled with the bus 99 for storing information and instructions for the central processor 101 and a non-volatile memory 103 (e.g., read only memory (ROM), programmable ROM, flash memory, EPROM, EEPROM, etc.) coupled to the bus 99 for storing static information and instructions for the processor 101. Exemplary computer system 100 also includes an optional data storage device 104 (e.g., memory card, hard drive, etc.) coupled with the bus 99 for storing information and instructions. Data storage device 104 can be removable. As described above, exemplary computer system 100 also contains an electronic display device 105 coupled to the bus 99 for displaying information to the computer user. In one embodiment, PC board 225 (FIG. 3) can contain the processor 101, the bus 99, the ROM 103 and the RAM 102.

Also included in computer system 100 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 100 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

With reference still to FIG. 5, exemplary computer system 100 also includes a signal input/output device 108 which is coupled to bus 99 for providing a communication link between computer system 100 and a network environment (e.g., network environment 50 and 51 of FIGS. 1A and 1B respectively). As such signal input/output device 108 enables central processor unit 101 to communicate wirelessly with other electronic systems coupled to the network. It should be appreciated that within the present embodiment, signal input/output device 108 is coupled to antenna 85 and provides the functionality to transmit and receive information over a wireless communication interface. It should be further appreciated that the present embodiment of signal input/output device 108 is well-suited to be implemented in a wide variety of ways. For example, signal input/output device 108 could be implemented as a modem. Further, signal input/output communication device 108, also coupled to bus 99, can be a serial port for communicating with the cradle 60. Additionally, device 108 can also include an infrared communication port.

Vcard and Vcalendar Formats

A method and system are described utilizing vCard (Internet Mail Consortium trademark) and vCalendar (Internet Mail Consortium trademark) technologies. The vCard technology defines a standardized format for creating directory information on an electronic business card and lists information typically found in business cards as well as other pertinent information. The vCalendar technology defines a standardized format for exchanging calendar and scheduling information. Both these technologies were formed to facilitate the exchange of the aforementioned types of information through various electronic media that is transport and platform independent.

The vCard technology defines a standardized format for providing directory information useable in various electronic media, including the Internet and personal information management (PIM) applications such as an address book. Typical information included within the vCard specification can be name, address, e-mail address, telephone, fax number and fax numbers. It can also include time-zone, geographic location, and multimedia data such as company logos and sound clips, as well as other information. The vCard specification is defined by the Internet Engineering Task Force (IETF), a worldwide organization that studies and proposes solutions to technical problems associated with the Internet. The IETF has released the specification for vCard version 3 in RFC 2425, MIME Content-Type for Directory Information and RFC 2426, vCard MIME Directory Profile.

FIG. 11 shows a simplified example of vCard information 1100 found in various electronic media. FIG. 11 illustrates the structure of the vCard format whereby the vCard information is distinguished by the begin:vCard (1105) and end:vcard (1110) lines within the text. Typical vCard information such as name 1115, e-mail address 1120 and various telephone numbers 1125 are shown in FIG. 11. The vCard format can include additional information as desired or needed by the user.

The vCalendar technology defines a standardized format for exchanging calendar and scheduling information useable in various electronic media, including the Internet and PIM applications such as a calendar program. Typical information included within the vCalendar specification can be dates and times for calendar events, schedules, to do lists, and journal entries as well as other information. The vCalendar specification is defined by the Internet Engineering Steering Group (hereinafter referred to as "IESG") in an iCalendar format. The IESG has approved the specification for iCalendar as proposed standards as outlined in the following Request for Comments as follows: RFC 2445, Internet Calendaring and Scheduling Core Object Specification (iCalendar); RFC 2446 iCalendar Transport-Independent Interoperability Protocol (iTIP): Scheduling Events, Busy Time, To-dos and Journal Entries; and RC 2447, iCalendar Message-based Interoperability protocol (iMIP).

FIG. 12 shows a simplified example of vCalendar information 1200. The vCalendar information is clearly distinguished by the BEGIN:VCALENDAR (1205) and END:VCALENDAR (1210) lines within the text. Typical information can be name of event (1230), start date of event (1220), and end date of event (1225).

Thus standardized vCard and vCalendar formats allow for interface and interoperability capabilities between various electronic media and PIM applications located on a user's computer system.

Figure 6:
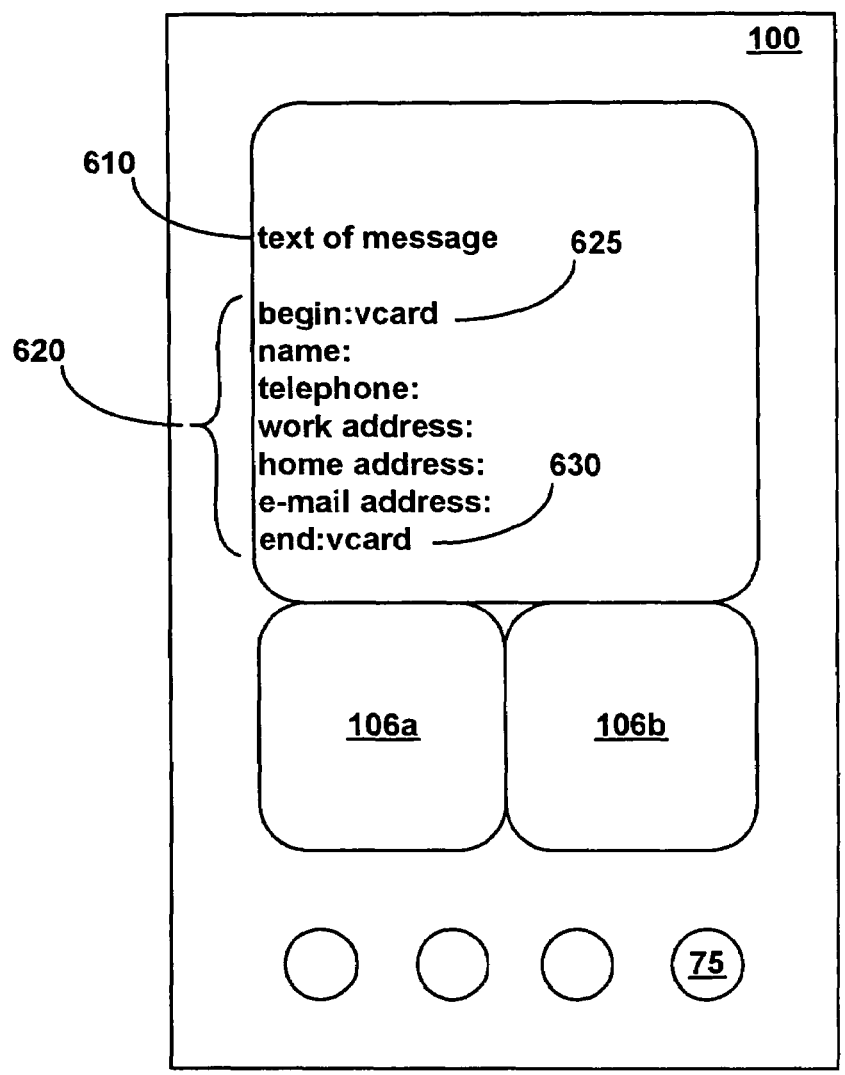
FIG. 6 is a front view of a palm top computer system illustrating the display screen, and a generalized form of an exemplary electronic mail message illustrating vCard features.

FIG. 6 is a front view of the palmtop computer system 100 with a displayed representation of an electronic mail (e-mail) message. The vCard information 620 is found at the end of the message text 610 or can be included as an attachment to message text 610. A reader of the e-mail can readily find the vCard information by looking for the begin 625 and end 630 markers.

Importing and Exporting Directory and Calendar Information to and From Personal Information Management Computer Applications Although the description of the present invention will focus on an exemplary personal digital assistant (hereinafter referred to as "PDA") or palmtop computer system, the present invention can be practiced with other electronic systems or electronic devices (e.g. personal computer systems, cellular phones, pagers, portable web devices, etc.).

Figure 7:
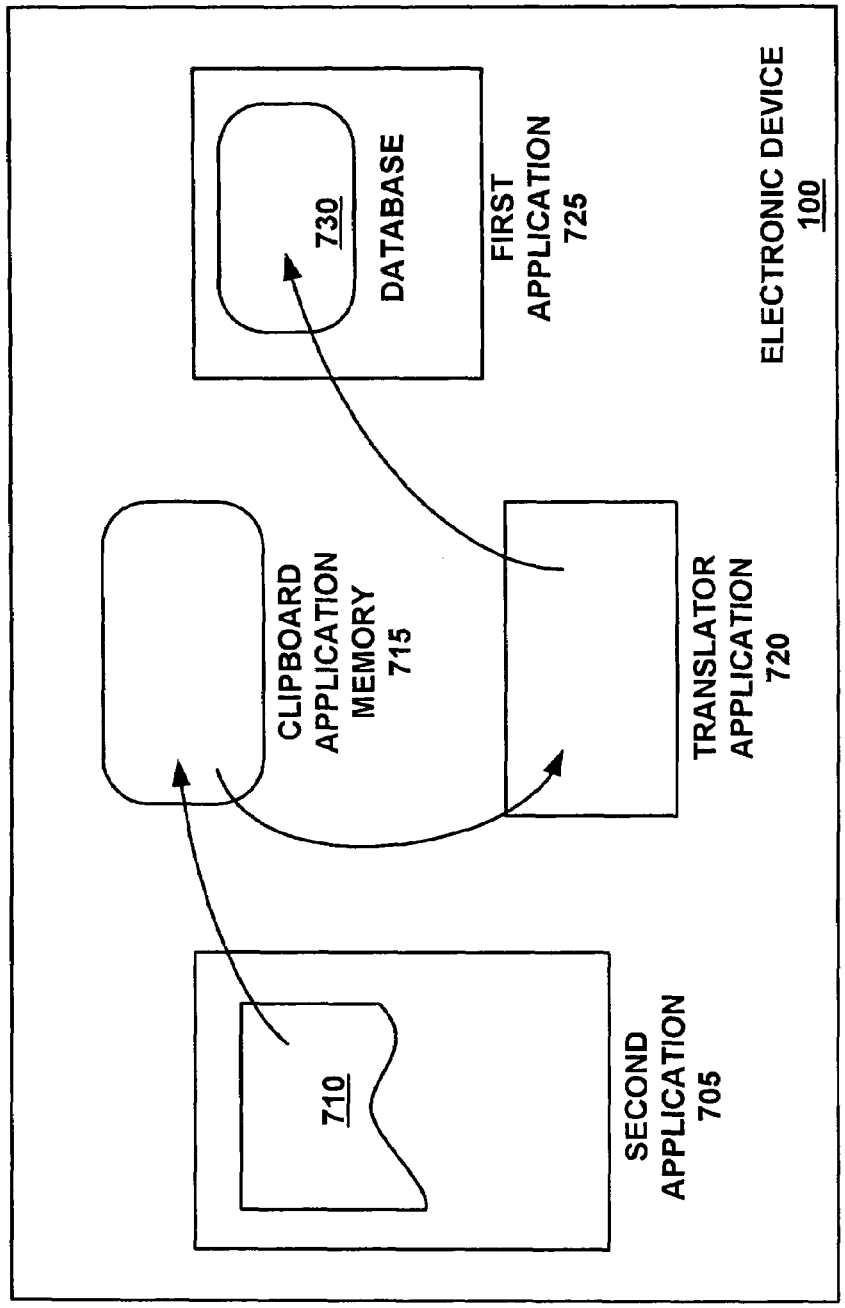
FIG. 7 illustrates a data-flow diagram illustrating the flow of information and the programs used to import selected information such as directory and calendar information to a computer application through the various electronic devices used in accordance with embodiments of the present invention.

FIG. 7 illustrates an exemplary data flow diagram for importing selected information to a computer application. Electronic device 100, such as a personal digital assistant (PDA) in accordance with embodiments of the present invention, displays multimedia information such as video and text from a second application 705. The multimedia information could be displayed from numerous electronic media such as electronic mail, Internet Web pages, resident computer applications, etc.

In one embodiment, a selected portion of the displayed multimedia information including textual information in a first format that is standardized is captured by highlighting the general area around the text. The captured text 710 is transferred to the memory of a support application that is capable of interfacing and operating between various programs and applications on a single electronic device such as a computer system. This support application has the general ability to copy text in a highlighted form of one computer application into memory, and then transfer the same to another computer application. One such application is the clipboard application that is found in the operating systems of many commercially available desktop computer systems. The clipboard application allows for the cutting or copying of highlighted textual information displayed from one application to a clipboard memory 715 and then subsequently pasting that information to the same or another application resident on electronic device 100. In the present embodiment, the captured portion of text is transferred to the clipboard memory 715.

A translator application 720 provides the final steps to importing the selected information to a first application 725. The captured text in clipboard memory 715 may include more text or information than desired. As such, the translator application 720 automatically extracts from the captured text the selected information desired by keeping only text that is in the selected first standardized format and discarding the rest. The translator application 720 then automatically translates the text that is in the standardized format to a second format that is native to the first computer application 725. Lastly, the translator application 720 automatically stores the translated information now in a native format as a record in the database 730 of the first application 725.

In another embodiment, captured text 710 is selected by highlighting the entire body of multimedia information accessed by the user, including the standardized textual information in a first format that is desired. This method does not require any cursor positioning within the text itself thereby insuring all the desired standardized information is captured.

Figure 8:
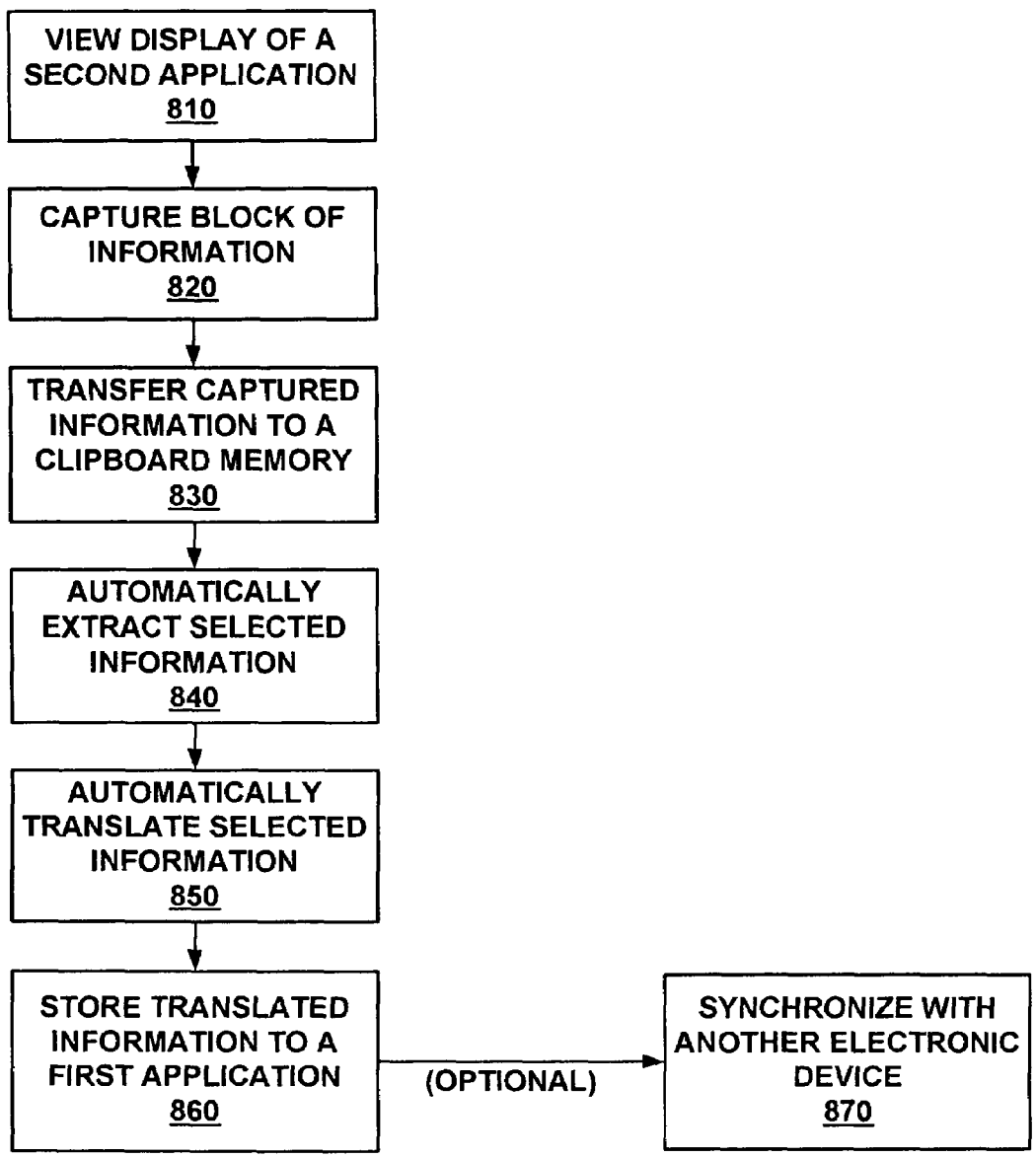
FIG. 8 is a flow diagram illustrating steps in a computer implemented method for importing selected information such as directory and calendar information to various computer applications in accordance with one embodiment of the present invention.

FIG. 8 illustrates a flow chart of steps in accordance with the import of selected information to a personal information management computer application. By way of demonstration, FIG. 8 shows one embodiment of the present invention whereby directory and calendar information found in an electronic mail (e-mail) message or on an Internet Web page are imported to corresponding electronic address book and calendar applications resident on PDA 100.

The method takes from the displayed e-mail or Internet Web page at step 810 a captured portion of text in step 820 that includes directory information in a standardized vCard format and calendar information in a standardized vCalendar format. Again, the directory and calendar information is captured by highlighting the area around the text of directory and calendar information.

The captured text 710 in step 830 is transferred to the memory of a support application such as the memory 715 of the clipboard application that is capable of interfacing and operating between various programs and applications on a single electronic device such as a computer system.

A translator application 720 provides the final steps to importing the selected information to a first application 725. The captured text in clipboard memory 715 may include more text or information than desired. As such, the translator application 720 in step 840 automatically extracts from the captured text in the clipboard memory 715 only text that is in the standardized vCard and vCalendar formats. In step 850, the translator application 720 automatically translates the text that is in the standardized vCard and vCalendar formats to formats that are native to the corresponding electronic address book and calendar applications. Lastly, in step 860 the translator application 720 automatically stores the translated directory and calendar information now in a native format as a record in the databases 730 of the corresponding electronic address book and calendar applications.

In still another embodiment of the present invention, PDA 100 can be synchronized with a second electronic device such that the directory and calendar information that is imported as a record to the databases associated with the corresponding electronic address book and calendar applications resident on PDA 100 can be synchronized with the databases associated with the corresponding address book and calendar computer application located on a second electronic device. For example, in step 870 of FIG. 8, directory and calendar information imported to the corresponding electronic address book and calendar resident on PDA 100 can be synchronized with the electronic address book and calendar applications located on a second electronic device such that such that the same directory and calendar information can be found on both devices.

Figure 9:
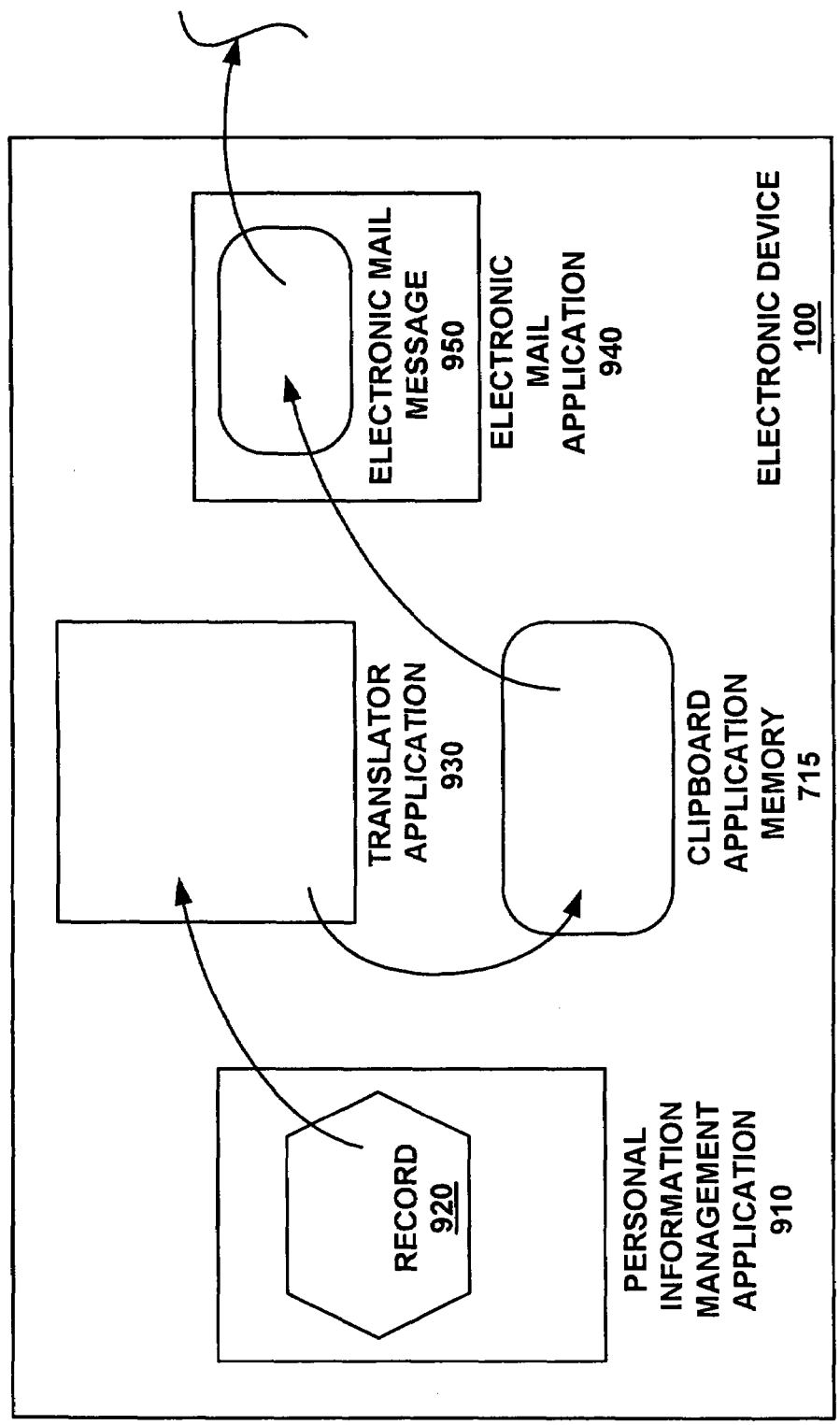
FIG. 9 illustrates a data-flow diagram illustrating the flow of information and the programs used to export selected information such as directory and calendar information from various computer applications through the various electronic devices used in accordance with embodiments of the present invention.

FIG. 9 illustrates an exemplary data flow diagram for exporting identified record information from a personal information management computer application 910. Electronic device 100, such as a personal digital assistant (PDA) in accordance with embodiments of the present invention, displays a record entry from the database associated with a corresponding personal information management application 910. The identified record 920 is shown on the display of PDA 100.

The identified record 920 is structured in a user friendly readable format that is native to a corresponding personal information management application 910. In order to export record 920, translator application 930 automatically translates the identified record 920 from the native format to a standardized text format that is recognizable by numerous computer applications.

The translator application 930 then automatically transfers the translated information to the memory of a support application that is capable of interfacing and operating between various programs and applications on a single electronic device such as PDA 100. This support application, as previously discussed in the import feature of the present invention, can be the clipboard application that is found in the operating systems of many commercially available desktop computer systems. As such, the translated textual information structured in a standardized format is transferred to clipboard memory 715.

The translated textual information structured in a standardized format found in clipboard memory 715 is then transferred or pasted into an electronic mail (e-mail) message 950 in the electronic mail application 940. The e-mail message 950 containing the selected record information structured in a standardized format can be sent to any addressee desiring the same information. In turn, the addressee can use the method and system of the present invention to import the above selected record information as a record into the database of that addressee's corresponding personal information management computer application.

Figure 10:
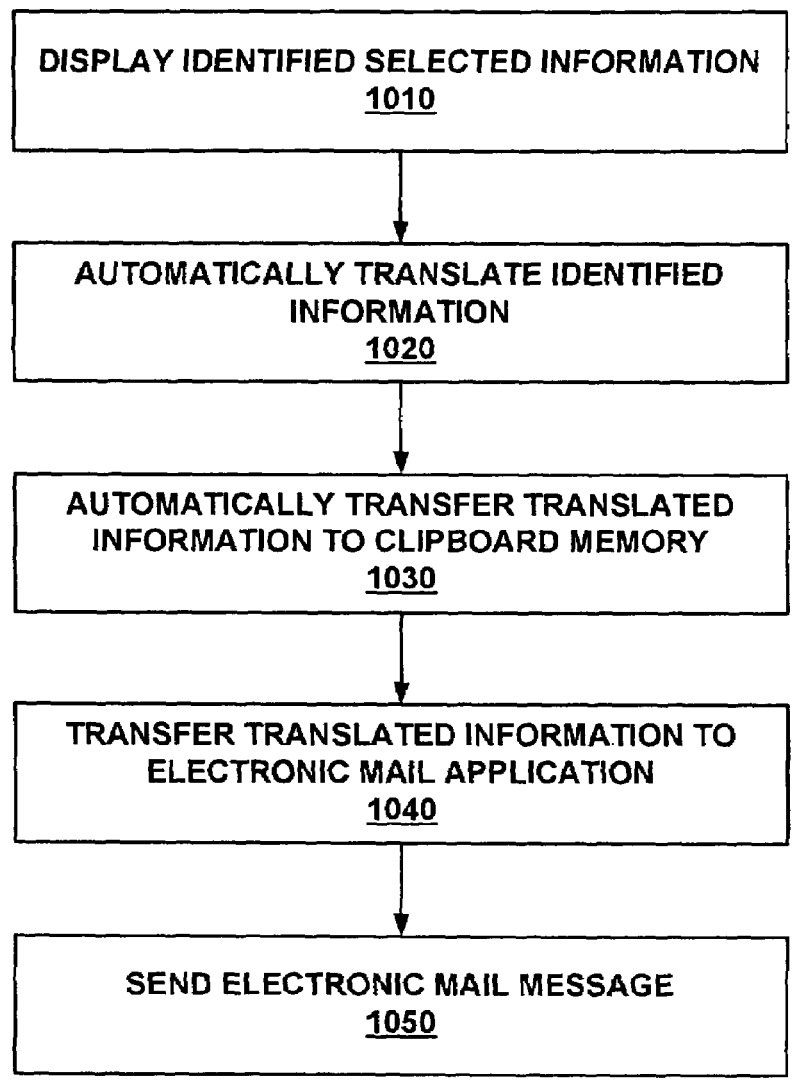
FIG. 10 is a flow diagram illustrating steps in a computer implemented method for exporting selected information such as directory and calendar information from various computer applications in accordance with one embodiment of the present invention.

FIG. 10 illustrates a flow chart of steps in accordance with the export of selected information from a personal information management application 910. By way of demonstration, FIGS. 9 and 10 show one embodiment of the present invention whereby directory or calendar information found in corresponding electronic address book or calendar applications resident on PDA 100 is exported.

The method and system displays identified directory or calendar record information from the databases associated with corresponding electronic address book or calendar applications in step 1010. The identified record is structured in a user friendly readable format that is native to a corresponding electronic address book or calendar application. In order for the information to be exported, translator application 930 automatically translates the identified directory or calendar record from the native format to the corresponding standardized vCard or vCalendar textual formats in step 1020.

In step 1030, the translator application 930 automatically transfers the translated textual information now structured in a vCard or vCalendar format to the clipboard memory 715 of the clipboard application. This clipboard application is capable of interfacing and operating between various programs and applications on a single electronic device such as PDA 100.

In step 1040, the translated textual information now structured in a vCard or vCalendar format is transferred from the clipboard memory 715 to an electronic mail message 950 in the electronic mail application 940 by pasting the translated information into message 950. The e-mail message 950 containing the directory or calendar information in a standardized format can be sent to any addressee desiring the same information in step 1050. Since the information is in the standardized vCard and vCalendar formats, in turn, the addressee can use the method and system of the present invention to import the above directory and calendar information to the addressee's own corresponding address book or calendar applications.

The preferred embodiment of the present invention, a method and system for importing and exporting directory and calendar information to and from personal information management computer applications, is thus described. While the present invention has been described in particular embodiments, it should be appreciated that the present invention should not be construed as limited by such embodiments, but rather construed according to the below claims.

What is claimed is:

1. In an electronic device, a method of importing selected information into a first application in said electronic device, comprising the steps of:
   a) capturing within a displayed screen of a second application a block of information received from a remote electronic device, said block of information comprising at least one of selected directory information in a vCard format and selected calendar information in a vCalendar format;
   wherein said capturing step comprises storing said block of information into a cache memory of said electronic device;
   b) transferring said block of information to a support application resident on said electronic device, the support application being an operating system tool available to a plurality of applications and capable of transferring information between said plurality of applications;
   c) automatically extracting said selected information by retaining only information in the first selected format and discarding any remainder;
   d) automatically translating said selected information from said vCard or vCalendar format into a second format that is native to said first application;
   e) automatically storing said translated information of said second format that is native to the first application as a record in a database of said first application; and
   f) synchronizing said first application located on said electronic device with a corresponding application located on a second electronic device.

2. A method as described in claim 1 wherein said first application is an electronic address book.

3. A method as described in claim 1 wherein said first application is an electronic calendar.

4. A method as described in claim 1 wherein said block of information is an electronic mail message.

5. A method as described in claim 1 wherein said block of information is an Internet Web page.

6. A method as described in claim 1 wherein said electronic device is a hand-held portable computer system.

7. A method as described in claim 1 wherein said step of transferring said block of information comprises copying said captured block of information into a clipboard memory of said electronic device.

8. A method as described in claim 1 wherein said support application is a clipboard.

9. A method in an electronic device of exporting selected information from a first application comprising the steps of:
  a) capturing selected information comprising at least one of certain directory information and certain calendar information of a first format that is located in a database of said first application, wherein said first format is native to said first application;
  b) automatically translating said captured selected information into a second format that is substantially compliant with a vCard or vCalendar standard format, wherein said second format enables a second application on a second electronic device remote from said electronic device to store said captured selected information in a format native to said second application;
  c) automatically extracting said selected information by retaining only information in the first selected format and discarding any remainder;
  d) transferring said information of said second format to a support application that is an operating system tool of the electronic device and is available to a plurality of applications on said electronic device, wherein said support application is capable of providing an interface between said plurality of applications,
  wherein said transferring said information of said second format further comprises copying said captured selected information into a clipboard memory of said electronic device;
  e) transferring said information of said second format from said support application to an email application that generates an electronic mail message including said information of said second format; and
  f) sending said electronic mail message to said second electronic device.

10. A method as described in claim 9 wherein said support application is a clipboard.

11. A method as described in claim 9 wherein said first application is an electronic address book.

12. A method as described in claim 9 wherein said first application is an electronic calendar.

13. A method as described in claim 9 wherein said electronic device is a hand-held portable computer system.

14. A computer system comprising a processor, a memory unit, and a display screen wherein said memory unit contains instructions that when executed import selected information into a first application on said computer system, comprising the steps of:
  a) capturing within a displayed screen of a second application a block of information that comprises said selected information of a first format that substantially compliant with a vCard or vCalendar standard format;
  wherein said capturing comprises storing said block of information into a cache memory of said memory unit;
  b) transferring said block of information to a support application resident on said computer system wherein said support application is an operating system tool available to a plurality of applications and is capable of providing interface between said plurality of applications;
  c) automatically extracting said selected information by retaining only information in the first selected format and discarding any remainder;
  d) automatically translating said selected information from said first format into a second format that is native to said first application;
  e) automatically storing said translated information of said second format as a record in a database of said first application; and
  f) synchronizing said first application with a corresponding application located on a second computer system.

15. A computer system as described in claim 14 wherein said first application is an electronic address book.

16. A computer system as described in claim 14 wherein said first application is an electronic calendar.

17. A computer system as described in claim 14 wherein said block of information is an electronic mail message.

18. A computer system as described in claim 14 wherein said block of information is an Internet Web page.

19. A computer system as described in claim 14 wherein said instructions are for automatically extracting said selected information by keeping only information in the first selected format and discarding the rest.

20. A computer system as described in claim 14 wherein said computer system is a hand-held portable computer system.

21. A computer system as described in claim 14 wherein said transferring said block of information comprises copying said captured block of information into a clipboard memory of said memory unit.

22. A computer system as described in claim 14 wherein said support application is a clipboard.

23. A computer system comprising a processor, a memory unit, and a display screen wherein said memory unit contains instructions that when executed export selected information from a first application on said computer system, comprising the steps of:
  a) capturing within a displayed screen of the first application a block of information that comprises at least one of directory information and calendar information in a native format;
  b) automatically translating said block of information into a second format that is a vCard format or a vCalendar format;
  c) automatically extracting said selected information by retaining only information in the first selected format and discarding any remainder;
  d) transferring the translated block of information to a support application resident on said computer system wherein said support application is an operating system tool available to a plurality of applications and is capable of providing interface between said plurality of applications,
  wherein said transferring the translated block of information further comprises copying said translated block of information into a clipboard memory of said computer system;
  e) transferring said translated block of information from said support application resident on said computer system to an electronic mail application resident on said computer system for generating an electronic mail message including said translated block of information; and
  f) sending said electronic mail message to a second computer.

* * * * *